W. BRAMHAM.
SPRING ATTACHMENT.
APPLICATION FILED APR. 21, 1910.
972,806.
Patented Oct. 18, 1910.
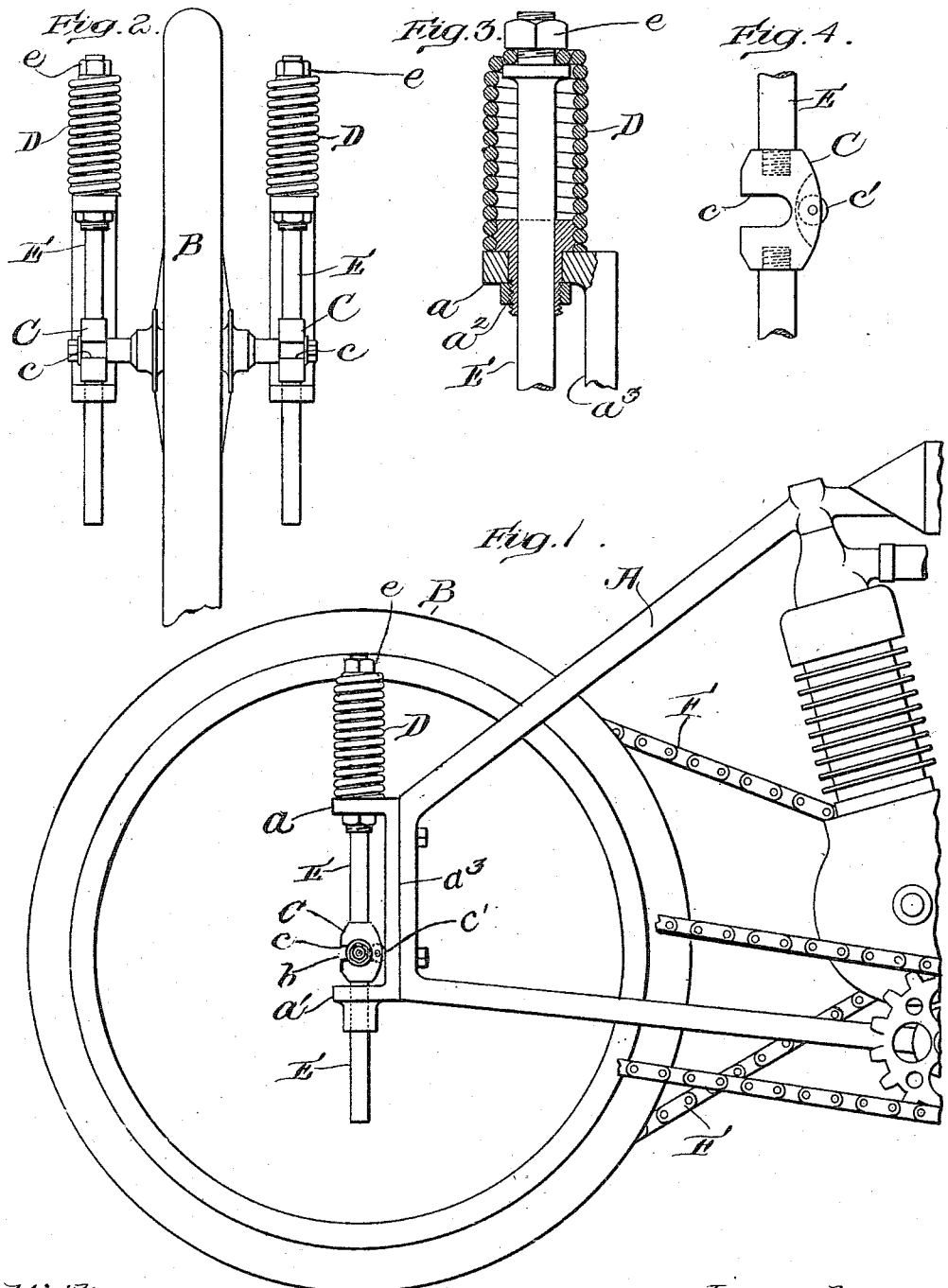

UNITED STATES PATENT OFFICE.

WILFRED BRAMHAM, OF BEVERLY, MASSACHUSETTS.

SPRING ATTACHMENT.

972,806.  Specification of Letters Patent.  Patented Oct. 18, 1910.

Application filed April 21, 1910. Serial No. 556,822.

*To all whom it may concern:*

Be it known that I, WILFRED BRAMHAM, a subject of the King of Great Britain, and resident of Beverly, in the county of Essex and State of Massachusetts, have invented new and useful Improvements in Spring Attachments, of which the following is a specification.

My invention relates to spring attachments for vehicles, and its object is to provide an attachment of simple and compact construction, which will obviate or render negligible the shocks and jars incident to the passage of a vehicle over rough or uneven roads, thus insuring the safety, ease and comfort of the rider. I am aware that many contrivances for accomplishing this purpose have been made and patented; so far as I am aware however, such attachments, in so far as they make use of springs, are provided with springs held under compression, which tend to close when the vehicle is subjected to a shock or jar. When used in connection with vehicles of light construction such for example as the modern bicycle, such compression spring attachments are more or less effective in lessening the slight jars and shocks; but when even a vehicle of light construction is subjected to the violent shocks incident to travel over any but the smoothest roads, the sudden tight closing of the springs and the tendency of their abutments to move toward and meet one another, tends rather to increase than diminish the jars, the result being that the shock is often augmented by the very device intended to obviate or lessen it. It is I believe, a significant circumstance that notwithstanding the many spring attachments heretofore devised, such attachments are not employed by the persons most interested in the provision of effective means for obviating shocks and jars in vehicles. This is evidenced, for example, by the fact of common knowledge especially among manufacturers and dealers, that very many persons though desirous of so doing find themselves physically unable to ride motor cycles because of the want of some effective means to obviate the violent shocks which occur in the riding of motor cycles even on ordinary roads.

My invention herein described, in contrast to the spring attachments with which I am familiar, comprises springs held under tension which, instead of closing when the vehicle is subjected to a shock as in the case of springs held under compression, expand so that their abutments move away from each other and regardless of its violence the shock cannot by any possibility be augmented by the rapid closing, or meeting of the abutments, of the spring.

Among the most advantageous uses to which my invention may be put is in combination with the frame and rear wheel of a motor cycle. The description will therefore be addressed for purposes of illustration, to its use in this environment, it being understood that the invention is by no means limited to such specific use.

Referring to the drawings which illustrate an embodiment of my invention, Figure 1 is a side elevation of a motor cycle provided with my invention; Fig. 2 is a rear elevation of the same; Fig. 3 is an enlarged detail partly in section, of the spring guide rod and bracket; and Fig. 4 is an enlarged detail showing the bearing block.

A is a frame forked in the usual manner and extending on opposite sides of the wheel B. Secured to the frame A in any suitable manner are brackets $a$ $a'$ provided with slots $c$ to facilitate the insertion or removal of the axle $b$ without dismantling the attachment. Tension springs D, preferably tension coiled springs as shown, have their lower ends secured to the brackets $a$, and guide rods E, which pass through the bushings $a^2$ upon the brackets $a$ connect the tops of said springs with the blocks C. Nuts $e$ are provided upon the guide rods E so that the tension of the springs D may be adjusted to suit the individual user. The guide rods E also pass through the bushings upon the brackets $a'$. Said guide rods E as shown in the drawings are made in two parts and secured in any suitable manner as by being screwed into opposite sides of the bearing blocks C as best shown in Fig. 4.

The pull of the tight driving belt or sprocket chain F connecting the wheel and the engine, tends to draw the wheel forward thus subjecting the guide rods E to considerable strain. In order to relieve said guide rods of such strain, the bearing blocks C are provided with means, preferably antifriction rollers, $c'$ (Fig. 4) which abut against and roll upon runways $a^3$ provided upon the frame A. Obviously, if desired the antifriction rollers $c'$ may be omitted and the bearing blocks C made of proper size and form to abut against and slide upon the runways $a^3$.

Normally the parts are in the position shown in Fig. 1. When the rider mounts the motor cycle and is seated thereon, the springs D are expanded and the frame and rider are suspended on said springs. It will, I believe, be clear that when the wheel strikes against an obstacle in its path, the axle $b$ with its bearing block C is lifted, causing the guide rods E to push up and expand the springs D, thus bringing said springs into action to obviate the shock of the blow.

By this construction a spring attachment is provided which is simple, strong, readily and economically manufactured and attached to a vehicle, and which permits the vehicle to which it is attached to be ridden with safety and comfort over rough as well as ordinary roads.

I claim:

1. In a vehicle in combination, a frame, a wheel and its axle, a bearing for said axle, an upwardly extending guide rod fast on said bearing and adapted to slide in said frame, said axle being substantially in the path of movement of said guide rod, and a spring under tension the upper end of which is connected with said guide rod and the lower end with said frame.

2. In a vehicle in combination, a frame, a wheel and its axle, a bearing block for said axle, a bracket secured to said frame above said block, a tension spring secured at its lower end to said bracket, a guide rod passing through said bracket and connecting the top of said spring and said block, a bracket secured to said frame below said block and a guide rod secured to said block and passing through said last named bracket, said axle being substantially in the path of movement of said guide rods.

3. In a vehicle in combination, a frame, a runway on said frame, a wheel, and its axle, said frame and axle being relatively movable, means including a spring connecting said frame and axle, a driving belt connecting said wheel and frame and a bearing block for said axle abutting against said runway.

4. In a vehicle in combination, a frame, a runway on said frame, a wheel and its axle, said frame and axle being relatively movable, means including a spring connecting said frame and axle, a driving belt connecting said wheel and frame and a bearing block for said axle provided with an antifriction roller abutting against said runway.

5. In a vehicle in combination, a frame, a runway on said frame, a wheel and its axle, a driving belt connecting said frame and axle, a bearing block for said axle abutting against said runway, a bracket secured to said frame above said block, a tension coiled spring secured at its lower end to said bracket, a guide rod passing through said bracket and connecting the top of said spring and said block, a bracket secured to said frame below said block and a guide rod secured to said block and passing through said last named bracket.

6. In a vehicle in combination, a frame, a runway on said frame, a wheel and its axle, a driving belt connecting said frame and axle, a bearing block for said axle having an antifriction roller abutting against said runway, a bracket secured to said frame above said block, a tension coiled spring secured at its lower end to said bracket, a guide rod passing through said bracket and connecting the top of said spring to said block, a bracket secured to said frame below said block and a guide rod secured to said block and passing through said last named bracket.

Signed by me at Beverly, Massachusetts this eighteenth day of April 1910.

WILFRED BRAMHAM.

Witnesses:
ALBERT E. PRESTON,
CHARLES D. WOODBERRY.